US007782523B2

(12) United States Patent
Ishii

(10) Patent No.: US 7,782,523 B2
(45) Date of Patent: Aug. 24, 2010

(54) ANALOG MICROMIRROR DEVICES WITH CONTINUOUS INTERMEDIATE STATES

(76) Inventor: Fusao Ishii, 350 Sharon Park Dr., G26, Menlo Park, CA (US) 94025

( * ) Notice: Subject to any disclaimer, the term of this patent is extended or adjusted under 35 U.S.C. 154(b) by 97 days.

(21) Appl. No.: 11/600,625

(22) Filed: Nov. 16, 2006

(65) Prior Publication Data

US 2007/0132682 A1 Jun. 14, 2007

Related U.S. Application Data

(63) Continuation-in-part of application No. 11/183,216, filed on Jul. 16, 2005, now Pat. No. 7,215,460, and a continuation-in-part of application No. 11/136,041, filed on May 23, 2005, now Pat. No. 7,304,783, and a continuation-in-part of application No. 11/121,543, filed on May 4, 2005, now Pat. No. 7,268,932, each and a continuation-in-part of application No. 10/699,143, filed on Nov. 1, 2003, now Pat. No. 6,903,860, and a continuation-in-part of application No. 10/699,140, filed on Nov. 1, 2003, now Pat. No. 6,862,127, which is a continuation-in-part of application No. 10/698,620, filed on Nov. 1, 2003, now abandoned.

(60) Provisional application No. 60/845,294, filed on Sep. 18, 2006.

(51) Int. Cl.
*G02B 26/00* (2006.01)
*G09G 5/00* (2006.01)

(52) U.S. Cl. ....................... 359/291; 359/290; 345/211; 345/84

(58) Field of Classification Search ......... 345/690–694, 345/204, 211, 48, 84
See application file for complete search history.

(56) References Cited

U.S. PATENT DOCUMENTS

| | | | | |
|---|---|---|---|---|
| 5,452,024 | A | 9/1995 | Sampsell | |
| 6,466,358 | B2 | 10/2002 | Tew | |
| 6,590,549 | B1 | 7/2003 | Marshall | |
| 6,999,224 | B2 | 2/2006 | Huibers | |
| 7,034,984 | B2 | 4/2006 | Pan et al. | |
| 7,079,095 | B2 * | 7/2006 | Marshall | 345/84 |
| 2005/0190429 | A1 | 9/2005 | Ishii | |
| 2005/0206992 | A1 | 9/2005 | Ishii | |
| 2005/0254116 | A1 | 11/2005 | Ishii | |
| 2007/0258124 | A1 * | 11/2007 | Chen et al. | 359/245 |

FOREIGN PATENT DOCUMENTS

| | | |
|---|---|---|
| JP | AA98078548 | 5/1997 |
| JP | AA01249287 | 12/2000 |
| JP | 2004-151723 | 5/2004 |

* cited by examiner

*Primary Examiner*—Duc Q Dinh
(74) *Attorney, Agent, or Firm*—Bo-In Lin

(57) ABSTRACT

An image display system includes an array of movable micromirrors each controlled by a mirror control system to oscillate between a fully ON and fully OFF positions. The mirror control system further includes at least electrode for applying voltages thereon according to an analog scale for controlling each of the micromirrors to oscillate substantially around a central angle of oscillation varying between the fully-On and fully-OFF angular positions, according to an analog angular scale corresponding to the analog scale of the voltage applied to the electrode(s). The brightness of a reflection from each of these micromirrors are therefore controllable according to an analog scale to generate a corresponding grayscale substantially according to an analog scale.

26 Claims, 18 Drawing Sheets

Fig. 1A (Prior Art)
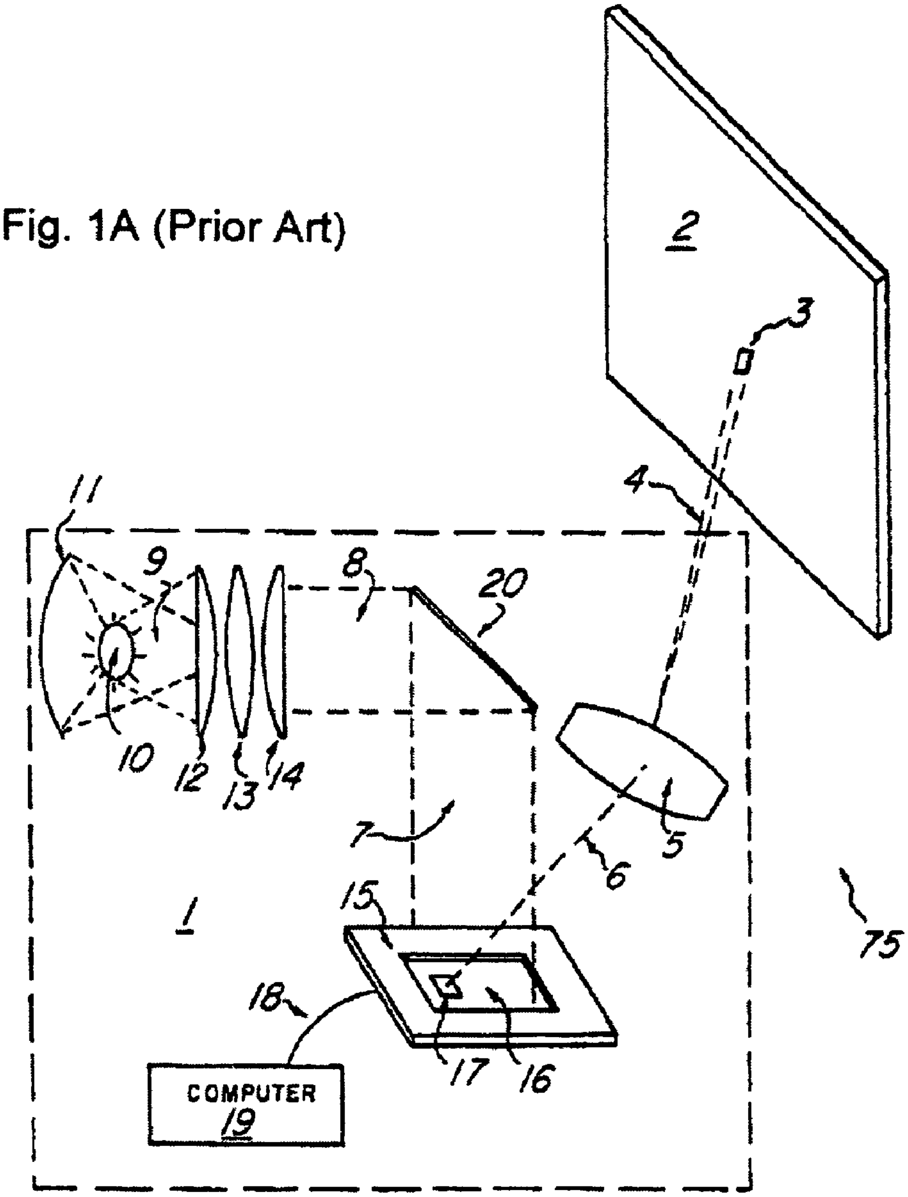
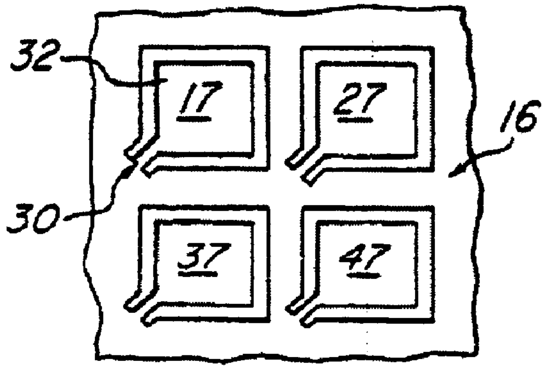
Fig. 1B (Prior Art)

High grayscale colors

Low grayscale colors

Fig. 12A Time(μ sec)

Time(μ sec)

ANALOG MICROMIRROR DEVICES WITH CONTINUOUS INTERMEDIATE STATES

This application is a Formal Application of a Provisional Application 60/845,294 filed on Sep. 18, 2006 by the Applicant of this Formal Application. The Provisional Patent Application 60/845,294 is a Continuation in Part (CIP) Application of U.S. patent application Ser. No. 11/121,543 filed on May 4, 2005, now U.S. Pat. No. 7,268,932, Ser. No. 11/136,041 filed on May 23, 2005 now U.S. Pat. No. 7,304,783 and Ser. No. 11/183,216 filed on Jul. 16, 2005 now U.S. Pat. No. 7,215,460. These three applications are Continuation in Part (CIP) Applications of three previously filed applications, which are Ser. No. 10/698,620 filed on Nov. 1, 2003, now abandoned Ser. No. 10/699,140 filed on Nov. 1, 2003, now U.S. Pat. No. 6,862,127, and Ser. No. 10/699,143 filed on Nov. 1, 2003 now U.S. Pat. No. 6,903,860, by the Applicant of this Patent Applications. The disclosures made in these Patent Applications are hereby incorporated by reference in this patent application.

TECHNICAL FIELD

This invention relates to projection display system. More particularly, this invention enables analog micromirror devices with continuous intermediate states and provides substantially higher grayscale for projection displays.

BACKGROUND ART

After the dominance of CRT technology in the display industry over 100 years, Flat Panel Display (hereafter FPD) and Projection Display obtained popularity because of smaller form-factor and larger size of screen. Among several types of projection displays, projection displays using micro-display are gaining recognition by consumers because of high performance of picture quality as well as lower cost than FPDs. There are two types of micro-displays used for projection displays in the market. One is micro-LCD (Liquid Crystal Display) and the other is micromirror technology. Because a micromirror device uses un-polarized light, a micromirror device has an advantage on brightness over micro-LCD, which uses polarized light.

Even though there are significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32*a*, which is the basis of the static random access switch memory (SRAM) design. All access transistors M9 in a row receive a DATA signal from a different bit-line 31*a*. The particular memory cell 32 to be written is accessed by turning on the appropriate row select transistor M9, using the ROW signal functioning as a wordline. Latch 32*a* is formed from two cross-coupled inverters, M5/M6 and M7/M8, which permit two stable states wherein state 1 is Node A high and Node B low and state 2 is Node A low and Node B high.

The dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position.

The micromirror having ON and OFF positions will have a reflecting state and a non-reflecting state as FIG. 1E. The light output as a function of time is shown in FIG. 1E. The minimum brightness is determined by the time width of the shortest pulse in the system.

As illustrated in FIG. 2A, when adjacent image pixels are shown with great degree of different gray scales due to a very coarse scale of controllable gray scale, artifacts are shown between these adjacent image pixels. That leads to image degradations. The image degradations are specially pronounced in bright areas of display when there are “bigger gaps” of gray scales between adjacent image pixels. FIG. 2B shows smaller step and it reduces the artifacts.

It was observed in an image of a woman that there were artifacts shown on the forehead, the sides of the nose and the upper arm. The artifacts are generated due to a technical limitation that the digital controlled display does not provide sufficient gray scales.

FIG. 3A shows a picture exaggerated with coarser grayscale. FIG. 3B shows a picture with typical grayscale, but it still shows some unnatural areas. At the bright spots of display, e.g., the forehead, the sides of the nose and the upper arm, the adjacent pixels are displayed with visible gaps of light intensities. When the levels of gray scales are increased, the image degradation will be much less even with only twice more levels of gray scales as illustrated in FIG. 2B.

As the micromirrors are controlled to have a fully on and a fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a strong hinge is necessary for the micromirror to sustain a required number of operational cycles for a designated lifetime of operation, In order to drive the micromirrors supported on a further strengthened hinge, a higher voltage is required. The higher voltage may exceed twenty volts and may even be as high as thirty volts. The micromirrors manufactured by applying the CMOS technologies probably would not be suitable for operation at such higher range of voltages and therefore the DMOS or High Voltage MOSFET technologies may be required. In order to achieve higher degree of gray scale control, a more complicate manufacturing process and larger device areas are necessary when DMOS micromirror is implemented. Conventional modes of micromirror control are therefore facing a technical challenge that the gray scale accuracy has to be sacrificed for the benefits of smaller and more cost effective micromirror display due to the operational voltage limitations.

There are many patents related to light intensity control. These Patents include U.S. Pat. Nos. 5,589,852, 6,232,963, 6,592,227, 6,648,476, and 6,819,064. There are further patents and patent applications related to different shapes of light sources. These patents includes U.S. Pat. Nos. 5,442,414, 6,036,318 and Application 20030147052. The U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation that includes U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties. Therefore, a need still exists in the art of image display systems applying digital control of a micromirror array as a spatial light modulator to provide new and improved systems such that the above-discussed difficulties can be resolved. The most difficulty to increase gray scale is that the conventional systems have only ON or OFF state and the minimum ON time cannot be reduced further because of limited driving voltage. The minimum ON time determines the height of the steps of gray scale in FIG. 2. There is no way to provide the brightness lower than the step. If a level of brightness lower than the step can be generated, it will increase gray scale and the degradation of picture quality will be improved substantially. Furthermore, if the brightness level of intermediate state can be controlled continuously, it will provide the freedom of system design as well as higher grayscale.

SUMMARY OF THE INVENTION

The object of this invention is to provide the analog control of brightness to achieve substantially higher grayscale for micromirror devices. The principle of the embodiments of this invention is to apply the voltage to the electrodes between zero and the hold-voltage to adjust the angle of the oscillation of mirrors. The reflectance of the incoming light is correlated with the swing angle of the mirrors, which can be continuously controlled by the applied voltages in analog way.

The hold-voltage can be adjusted with a suitable design of the gap between the mirror and the electrode at the stop position. By optimizing the configuration including the gap and hold-voltage, it is possible to control the reflectance of the mirror as low as 1/256 of the fully ON state by applying the voltage between zero and the hold-voltage to the electrode. This can provide 16 bit grayscale which is required for the next generation optical video disc players.

The driving voltage required for this invention is an analog intermediate voltage on top of full ON and full OFF voltages. Although the two electrodes require different voltages, it is possible to use a single bit line for a pixel with this invention. A single bit-line can provide an important benefit for compact and smaller micromirrors.

BRIEF DESCRIPTION OF DRAWINGS

FIGS. 1A and 1B show a prior art illustrating the basic principle of a projection display using a micromirror device.

FIG. 12A illustrates the result of the simulation wherein the initial angle of the mirror is −12 deg. and near hold-voltage is applied to the right electrode and zero volts is applied to the left electrode.

DETAILED DESCRIPTION OF THE PREFERRED EMBODIMENTS

The object of this invention is to provide the analog control of brightness to achieve substantially higher grayscale for micromirror devices. The principle of the embodiments of this invention is to apply the voltage to the electrodes between zero and a "hold-voltage", i.e., a V-hold voltage, to adjust a "central angle of oscillation" of mirrors. The reflectance of the incoming light is correlated with this central angle of oscillation of the mirrors, which can be continuously controlled by the applied voltages to the electrodes according to an approximately analog scale such that the gray scale of the display can be controlled according to an analog scale corresponding to the voltages applied to the electrodes.

Figure 1C:
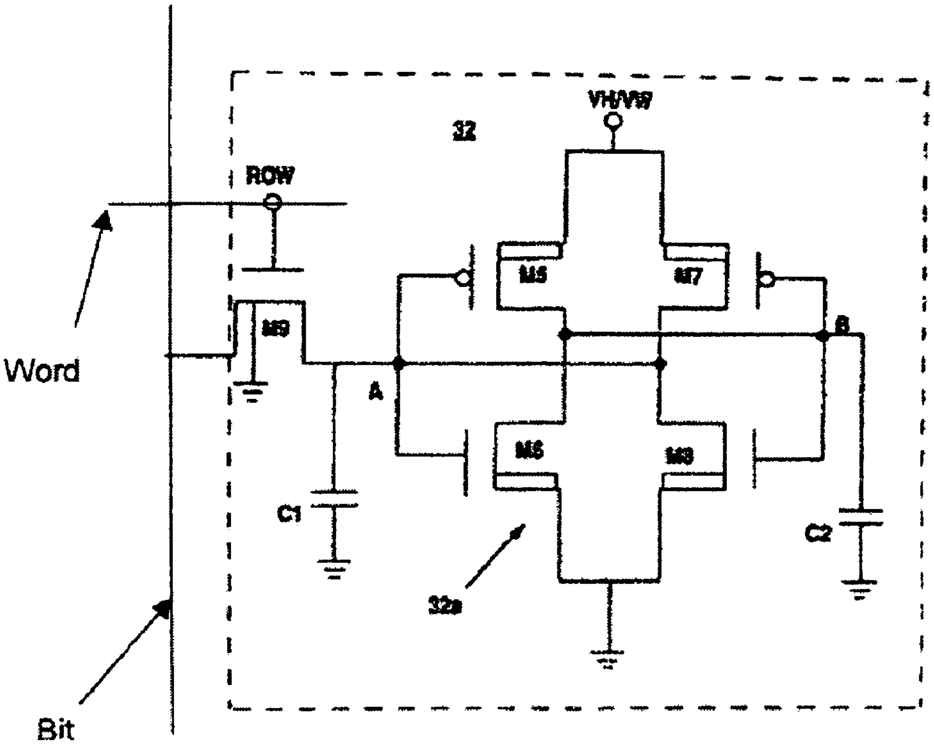
Fig. 1C (Prior Art)
FIG. 1C shows an example of the driving circuit of prior arts
Figure 1D:
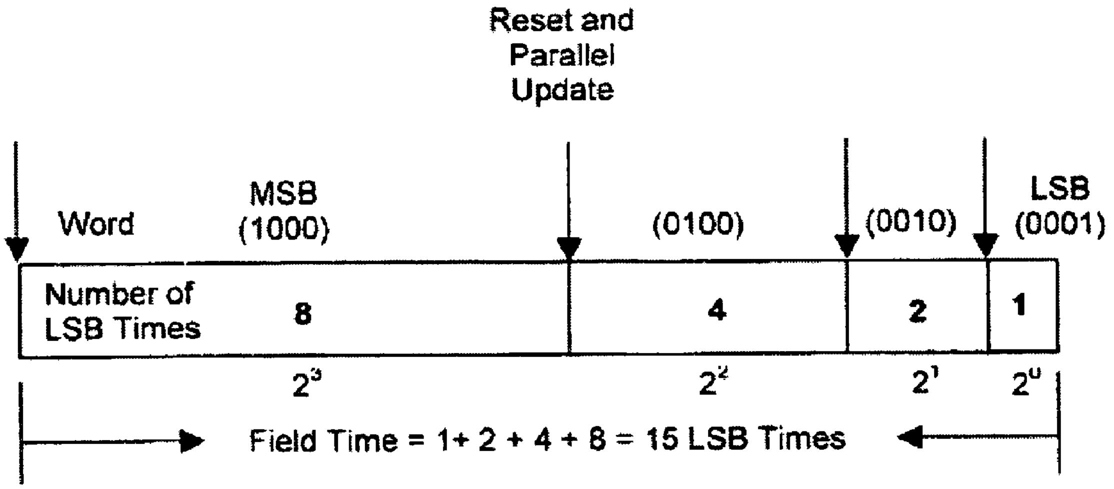
Fig. 1D (Prior Art)
FIG. 1D shows the scheme of Binary Pulse Width Modulation (Binary PWM) of conventional digital micromirrors to generate grayscale and FIG. 1E shows the micromirror is controlled to operate at the ON and OFF positions and the light output as a function of time.
Figure 1E:
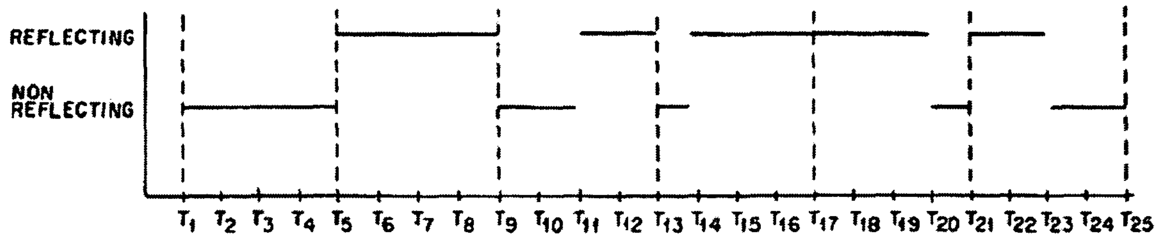
Fig. 1E (Prior Art)
Figure 2A:
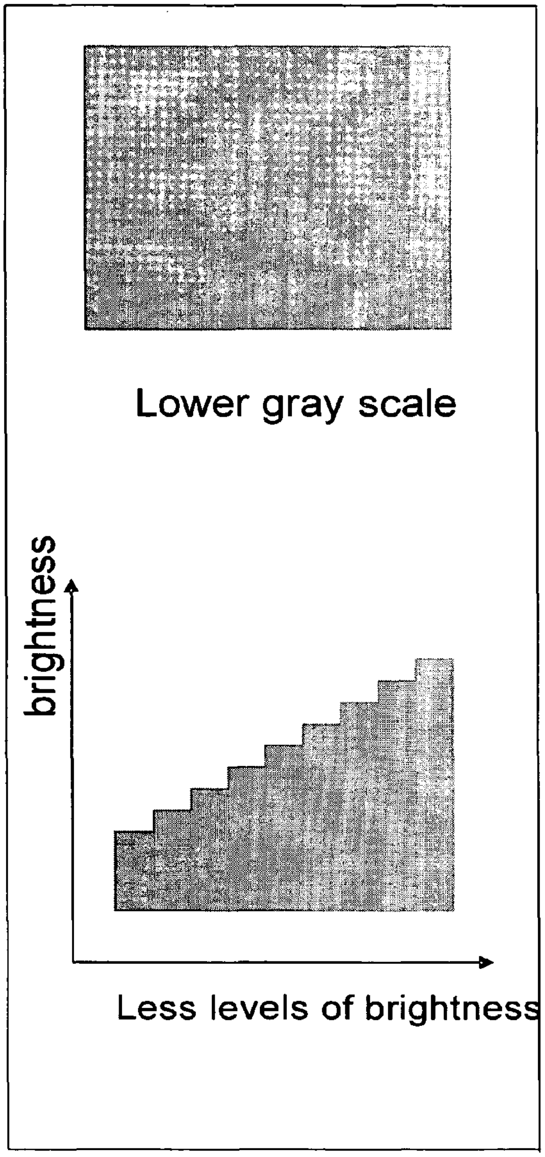
FIG. 2A shows an example of insufficient grayscale, where the minimum step of brightness change is very large and the artifacts are very visible.
Figure 2B:
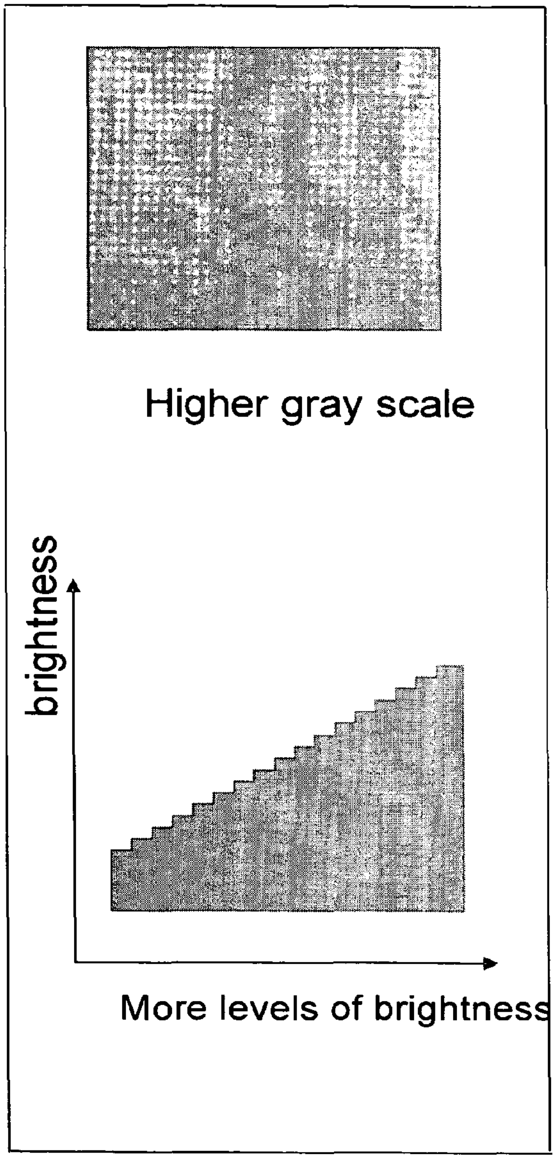
FIG. 2B shows an example of improved grayscale, where the artifacts are less visible.
Figure 3A:
FIG. 3A shows an example of a picture having insufficient grayscale and very visible artifacts.
Figure 3B:
FIG. 3B shows an example of the same picture with improved grayscale.
Figure 4A:
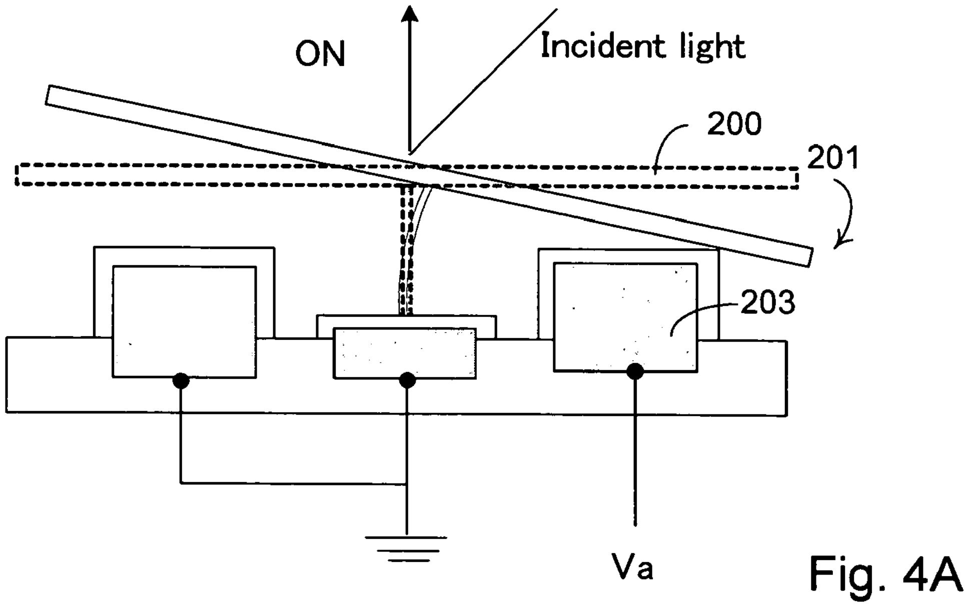
FIGS. 4A and 4B illustrate an example of a micromirror used for the embodiments of this invention.
Figure 4B:
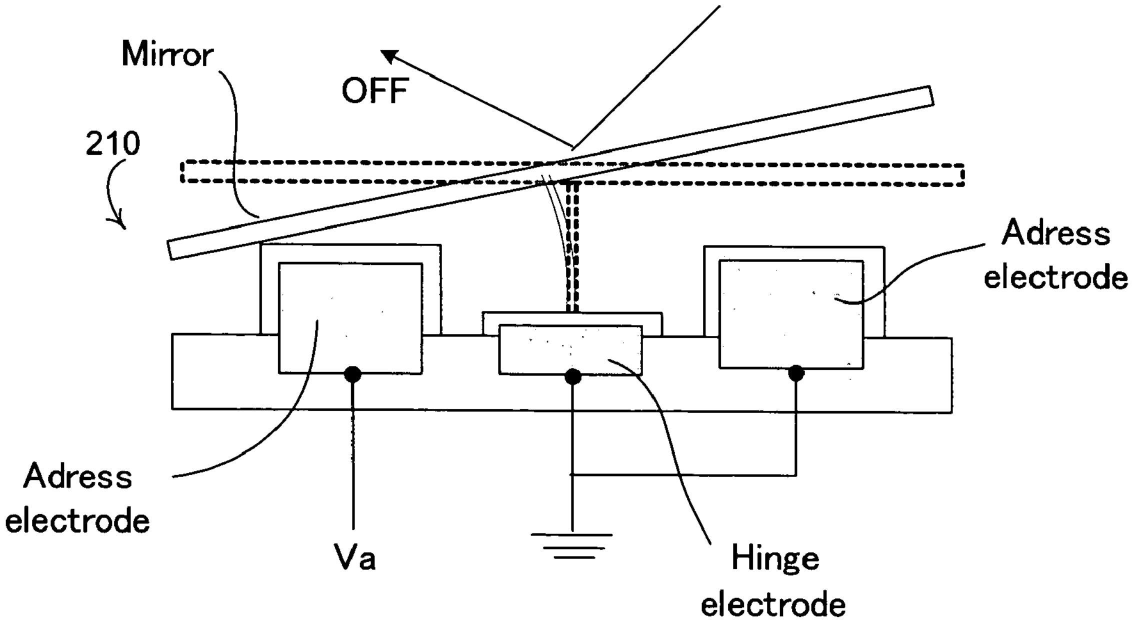

FIG. 4A and FIG. 4B show the basic structure of a micromirror 200 that is a mirror plate in a neutral position or zero angle. When a voltage higher than or equal to a pull-in-voltage, Va, is applied to the right electrode 203, the mirror plate is pulled toward the electrode, 203, until the mirror plate comes into contact with the electrode or a stopper. The display system with a projection lens is arranged such that the mirror at the position 201 reflects a maximum amount of incoming light into the projection lens (not shown). Referring to FIG. 4B, in the same way, as the voltage, Va, is applied to the left electrode, the mirror is pulled toward the left electrode. At a position 210 the mirror reflects a minimum amount of the incoming light to the projection lens.

Figure 5:
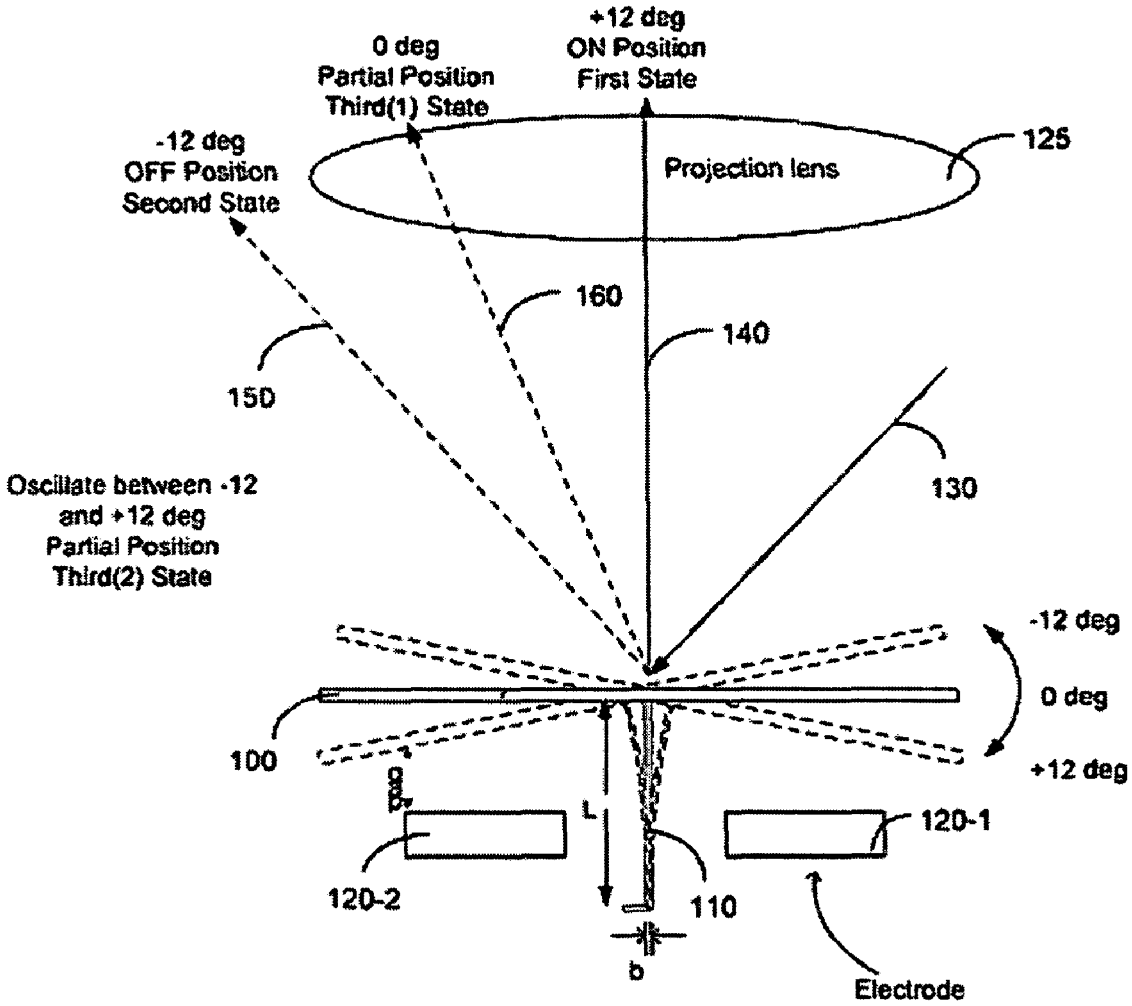
FIG. 5 illustrates an example of a micromirror at an oscillating state, which reflects lower brightness than the light reflected by the mirror at a full ON position.

As illustrated in FIG. 5, the reflect light 140 is reflected from the micromirror 100 supported on a mirror hinge 110 and controlled by the electrodes 120-1 and 120-2 to oscillate to an angle at the ON position, i.e., at zero degree relative to a horizontal direction for reflecting the maximum amount of light into the projection lens 125. Another reflecting light 150 is projected from the micromirror 120 at an angular position of −12 degrees that is an OFF position of the reflecting mirror for reflecting a minimum amount of light into the lens 125. When the voltages applied to the electrodes control the mirror to oscillate relative to a central angle of oscillation in an intermediate angle for projecting a reflecting light 160, an intermediate amount of reflecting light is reflected from the reflecting mirror and projected into the projection lens 125.

Figure 6:
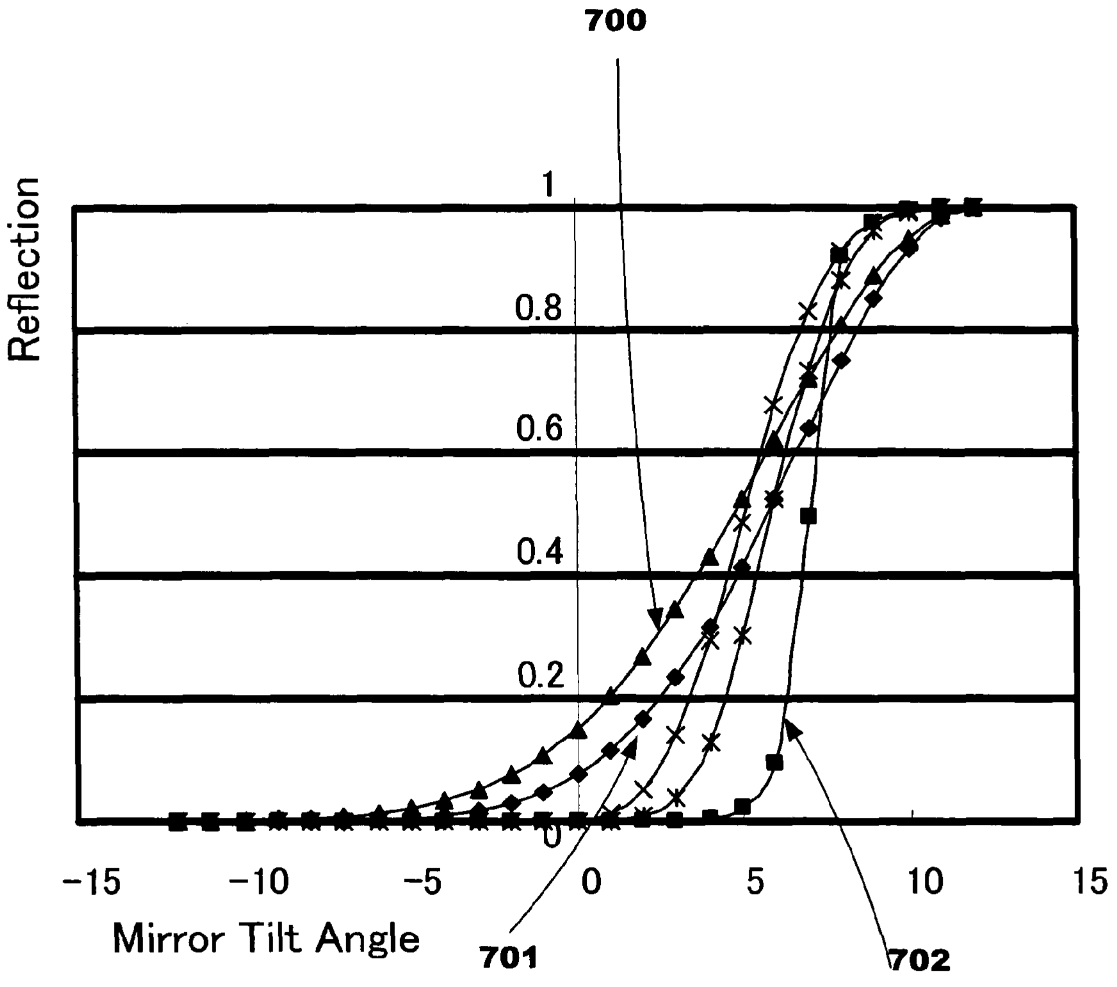
FIG. 6 illustrates the examples of the correlation between the reflectance of incoming light to the projection lens vs. the mirror tilt angles
Figure 7:
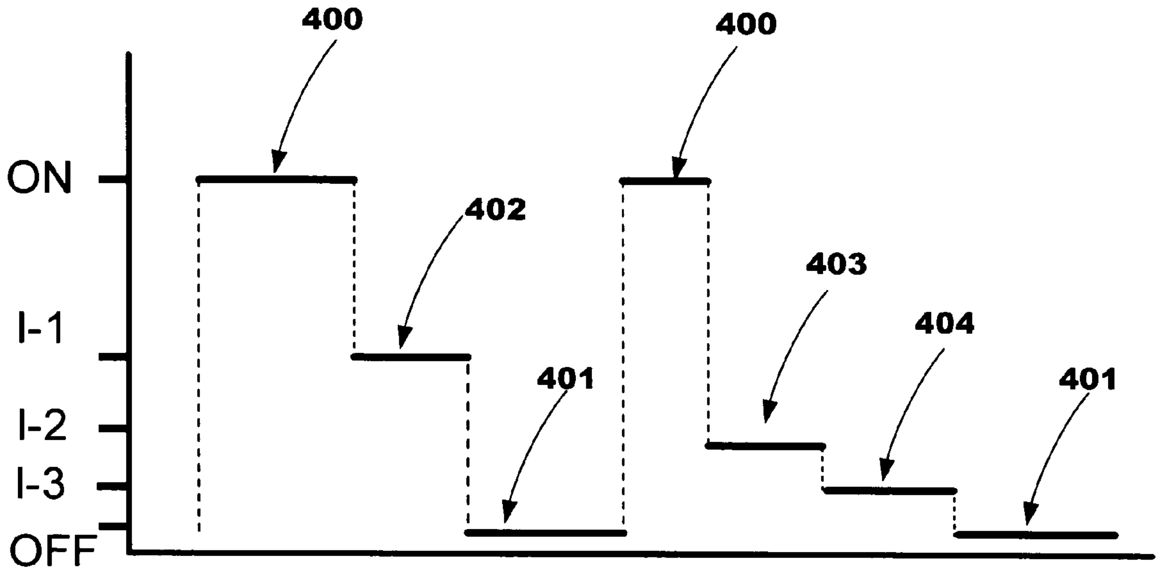
FIG. 7 illustrates the examples of desired level of reflectance by the mirror.

The correlation between the mirror angle and the intensity of the reflection light is shown in FIG. 6. Several simulation analyses are conducted with different scattering characteristics of mirrors and F values of the projection lens 125 where F represents an aperture of the lens. When the surface of mirror allows a wider scattering of incoming light the correlation curve between the reflection and the mirror tilt angle tends to have a correlation approximated by a curve 700. With a narrower scattering of the incoming light the correlation between the reflection and tilt angle is approximated by the curve 702. The correlation also depends on the size of aperture of the lens that generally referred to as the "F value". The curve 701 shows a correlation curve from the mirror to a lens with a smaller aperture than a lens that that receives the scattered reflection as that shown in the curve 700. The objective is to control the reflectance as desired, more particularly, to obtain the brightness of 1, ½, ¼, ⅛, 1/16, . . . and 1/256. FIG. 7 shows the examples of various levels of grayscale as 400(1), 402(½), 403(¼), 404(⅛) and 405(1/16). The common practice in the display industry is so called 8-bit grayscale, meaning 256 (=2^8) levels of grayscale. If the brightness levels down to 1/256 are added. The brightness level of the reflecting light from the micromirror when the micromirror is at an angular position of Full-ON is 1 (one) and Full OFF is 0(zero) and the brightness level of this biased oscillation can be 1/256. It can be any arbitrary number between 0.6 (60%) and 0.002 (0.2%) by adjusting the electrode voltages suitably under hold-voltage. The total number of grayscale levels for a 16 bits controllable states is 65,536 that is equal to 2^16=65,536. The recent standardization of High Definition Optical Disc incorporates 16-bit grayscale. One aspect of this invention is to apply two complimentary voltages to the electrodes 120-1 and 120-2 in substantially an analog fashion. In responding to the applied voltage, the micromirror can be controlled to have a central angle of oscillation positioned at an angular position according to an analog scale thus generate the levels of grayscales according to a corresponding analog level.

Figure 8A:
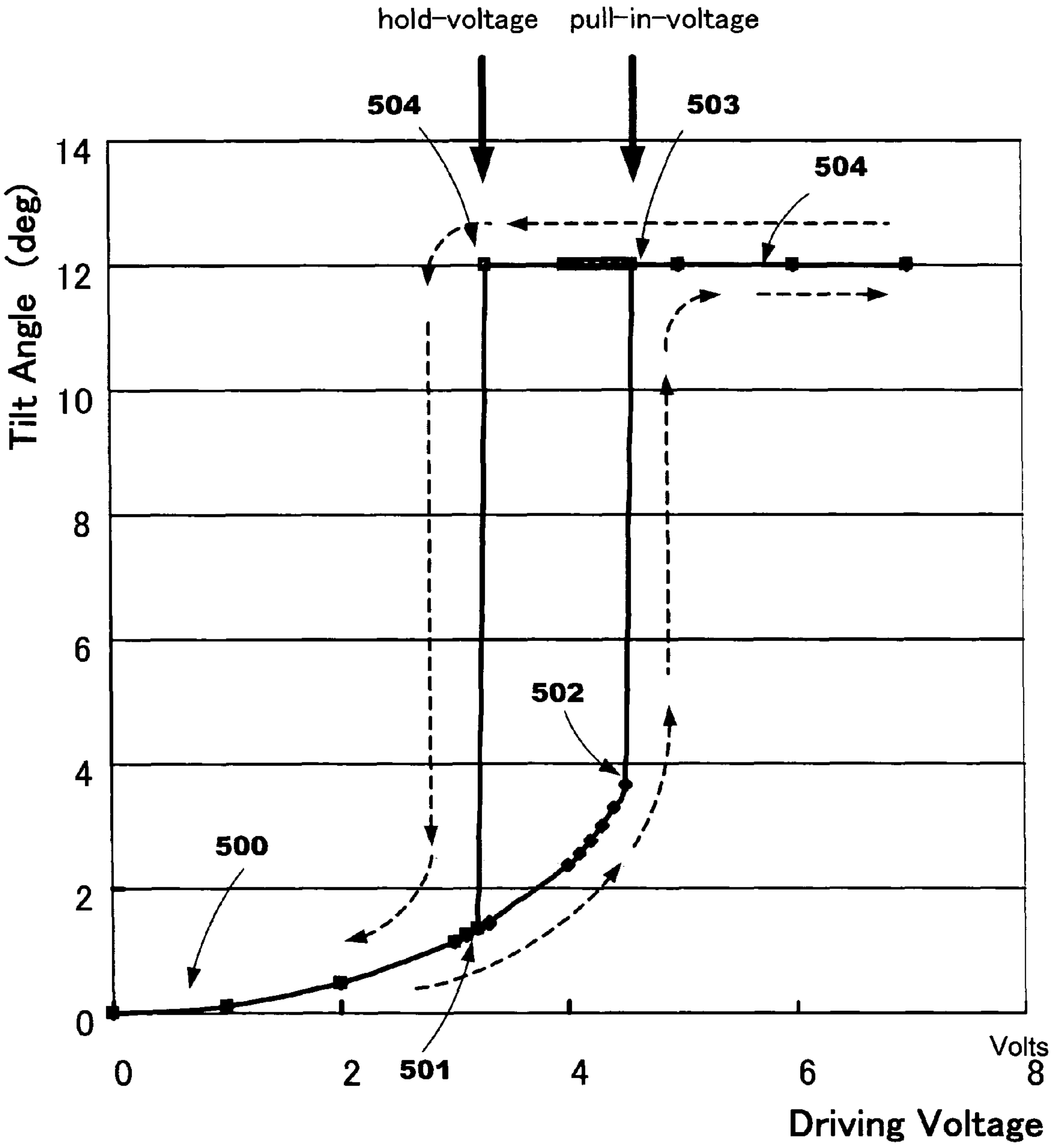
FIG. 8 illustrates an example of the correlation between the driving voltage applied to the electrode vs. the tilt angle of the mirror.
Figure 8B:
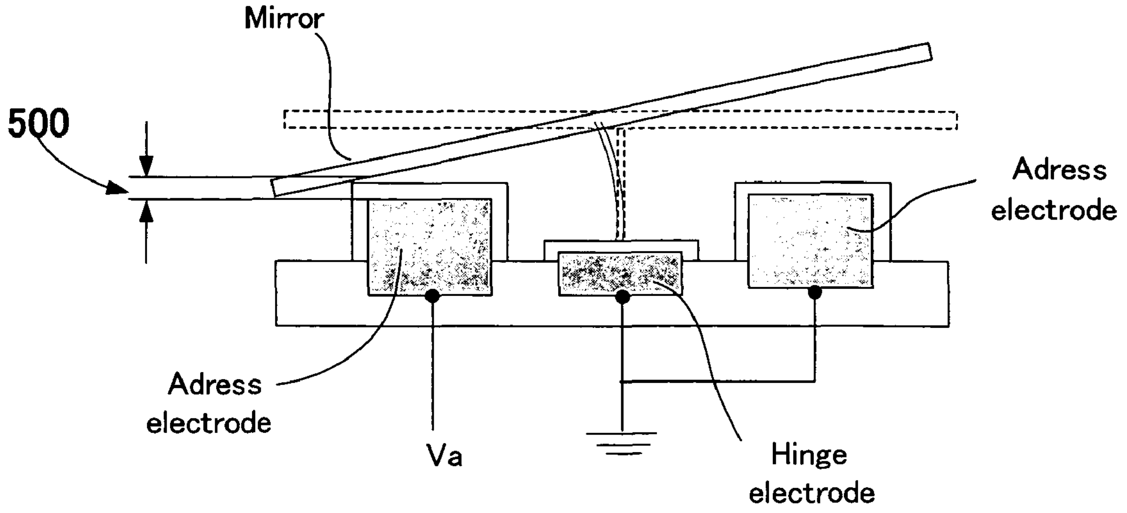

Referring to FIG. 8A for a correlation between the driving voltage applied to the electrode 120-1 or 120-2 and the tilt angle of the mirror. As the driving voltage is increased to from 500 to 502, the angle of the mirror is gradually increased according to a parabolic curve. When the driving voltage is beyond a voltage shown as voltage 502, the mirror is pulled in toward the electrode until it hits a stopper. The voltage corresponding to the "pull-in-position" is defined as the pull-in voltage with the mirror pulled-in and continues to move with a substantially constant pull-in voltage until the mirror stops when the mirror comes into physical contact with the stopper. The "pull-in-voltage" is defined as the minimum voltage required to pull the mirror to the "pull-in-position". In an exemplary embodiment shown in FIG. 8A, a maximum angular position of the mirror is shown as 12 degrees where the mirror is oscillated and stopped at a stopper position. The curve in FIG. 8A is the results of a simulation analysis according to a mirror design for a mirror system according to the model shown in FIG. 5. After the mirror is pulled in, the applied voltage is gradually reduced as shown in a line along the gradually decreasing voltages 504, 503 to 505 where the mirror stays at a constant tilt angle, e.g., at 12 degrees, and the pulled in position will not move back even below the pull in voltage, 503. This is because the narrow gap between the mirror and the electrode at the pull-in position enables the electrode to assert a stronger force on the mirror to hold the mirror even the voltage is reduced to a lower voltage. The mirror is released and begins to oscillate toward a direction of smaller tilt angle when the voltage is further reduced to a voltage below a certain voltage as shown in point 504 in FIG. 8A. Therefore, a minimum voltage to hold the mirror in a pull-in-position is shown as voltage 504 that is defined as "hold-voltage".

Figure 8C:
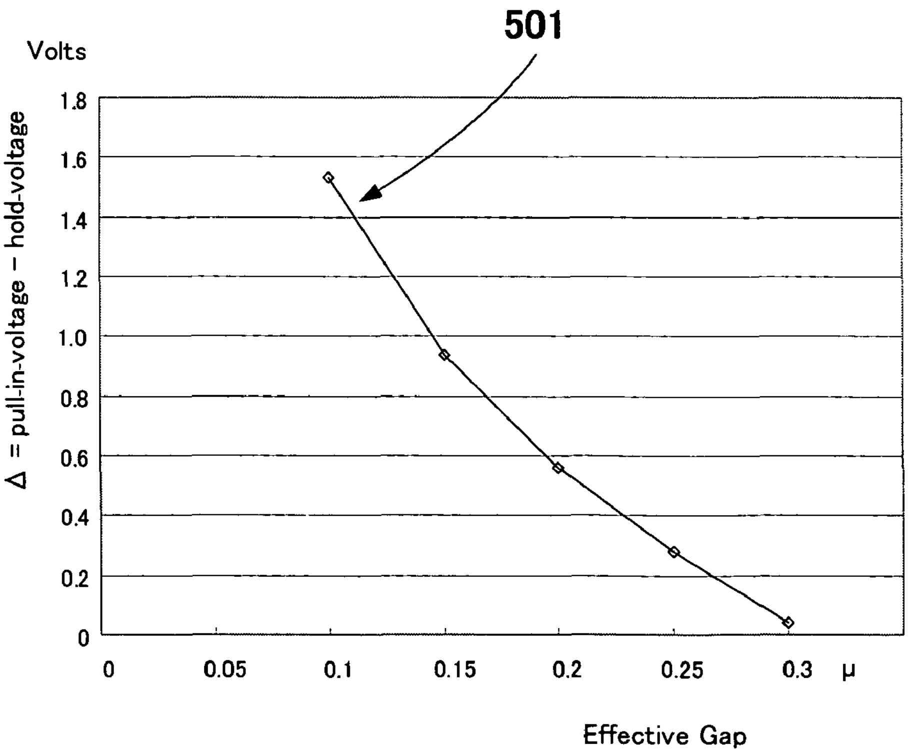

The difference between the hold-voltage (V-hold) and the pull-in-voltage (V-pull-in), shown as Δ in FIG. 8C. As shown in FIG. 8C, the difference between V-pull-in and V-hold is determined by the configuration of the mirror and the electrodes. Particularly, the gap (501) between the mirror and the electrode at the stop position is the most influential parameter for determining the amount of Δ. The narrower gap, the larger difference was found and the difference turned out to be adjustable with a suitable design of the gap as in illustrated in FIG. 8C. The effective gap can be calculated as the summation of the air gap and the thickness of dielectric material divided by the relative permittivity. An example of the correlation between the effective gap and the difference, Δ, is shown as the curve (511) in FIG. 8C.

In this simulation, the tilt angle of the mirror between 0 and 4 degrees is controllable by the applied voltage with the micromirror stay at a fixed angular position. But when the micromirror is moved to an angle between 4 and 12 degrees, the micromirror starts to oscillate continuously and cannot be controlled to stay at a certain fixed angular position even though the micromirror oscillates symmetrically relative to a central oscillation angle. Comparing the correlation curve in FIG. 6 (the tilt angle vs. the reflectance), the angle between 0 and 4 degrees is obviously not enough to control the grayscale. Due to this limitation, conventional system cannot provide a control methodology to control the micromirror with an analog control. In the conventional image display system, the industry has to move away from an analog control method to a digital control system that controls the light reflection when the micromirror is positioned at only the Fully ON position and Fully OFF position. The grayscale is controlled by Pulse Width Modulation (PWM), which controls the time of ON position to obtain intermediate brightness, in other words, grayscale. In contrast, the image display system of this invention applies analog complimentary voltages to the electrodes to control the central angle of oscillation of the micromirror according to an analog scale. As will be further explained below, an analog control of the grayscales is achieved.

Figure 9:
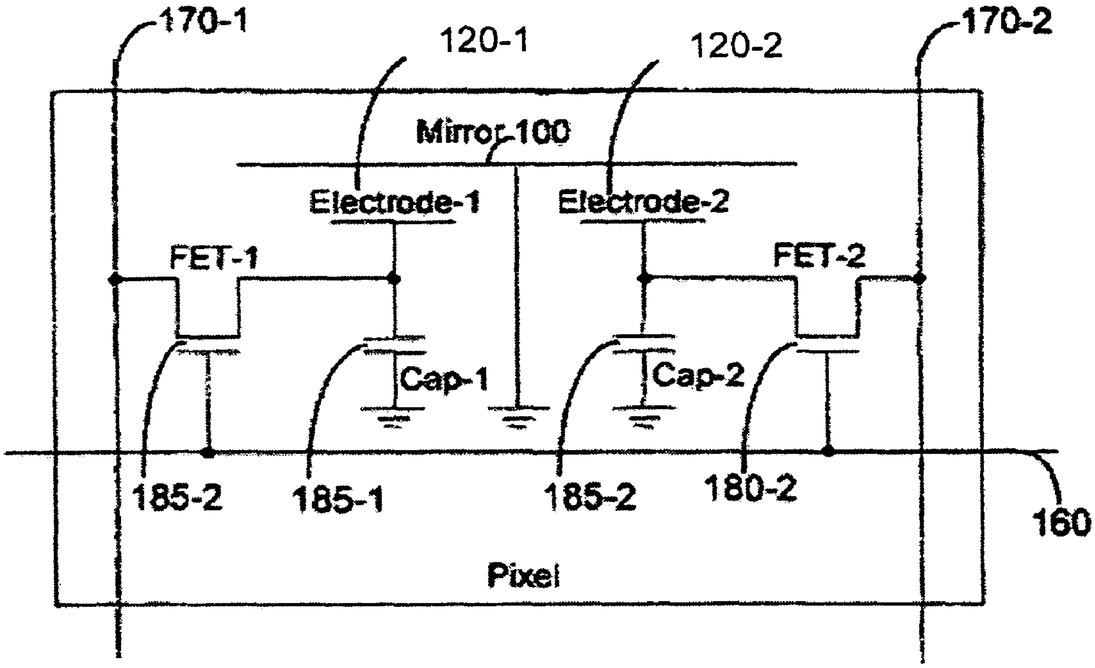
FIG. 9 shows an example of the circuit used to implement the invention. This example has two bit-lines.

FIG. 9 shows an example of the circuit used for the embodiment of this invention. Two bit-lines (170-1 and 170-2) are provided to control the two FETs, i.e., respectively FET-1 and FET-2, independently. The word-line is shown as 160. When the word line is on, the signal voltage from the bit-line 170-1 is transferred to Electrode-1 shown as 120-1 and the signal voltage from 170-2 is transferred to Electrode-2, i.e., electrode 120-2. After the word-line is off, because of the capacitances, Cap-1 and Cap-2, shown as capacitor 185-1 and capacitor 185-2 respectively, the voltages of the electrodes are maintained.

Figure 10:
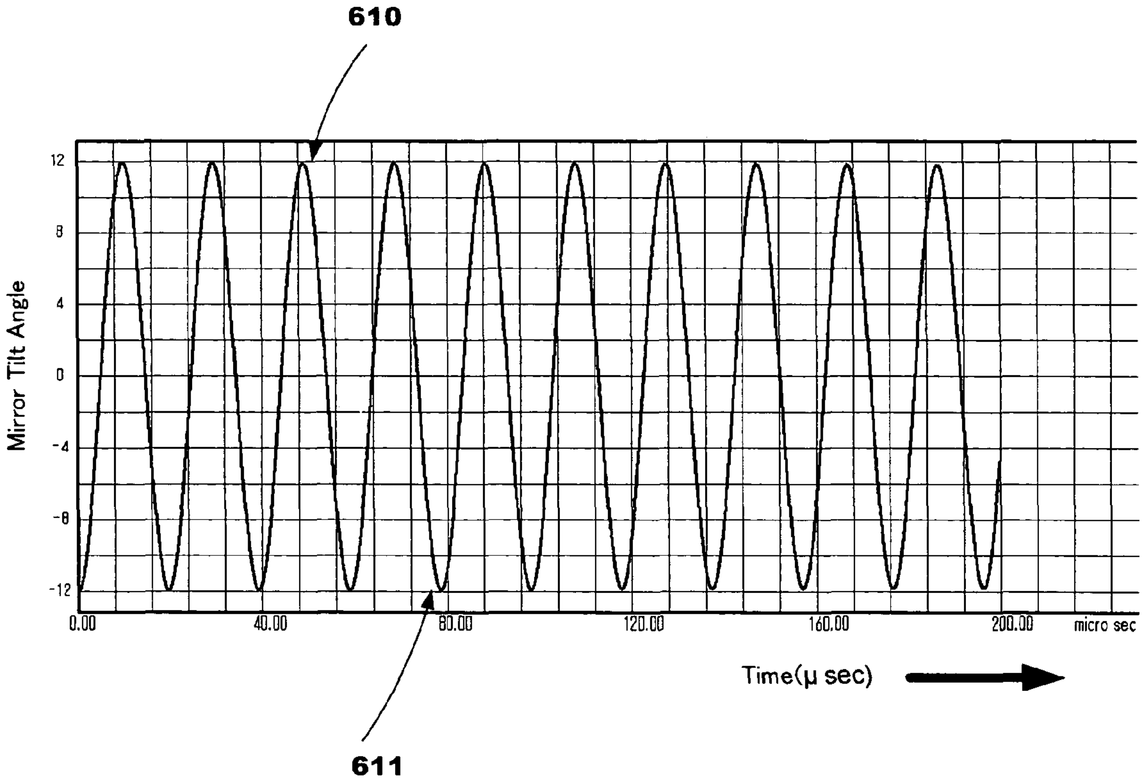
FIG. 10 illustrates the simulation result of the reflectance of the mirror, when zero volt is applied to both electrodes.
Figure 11A:
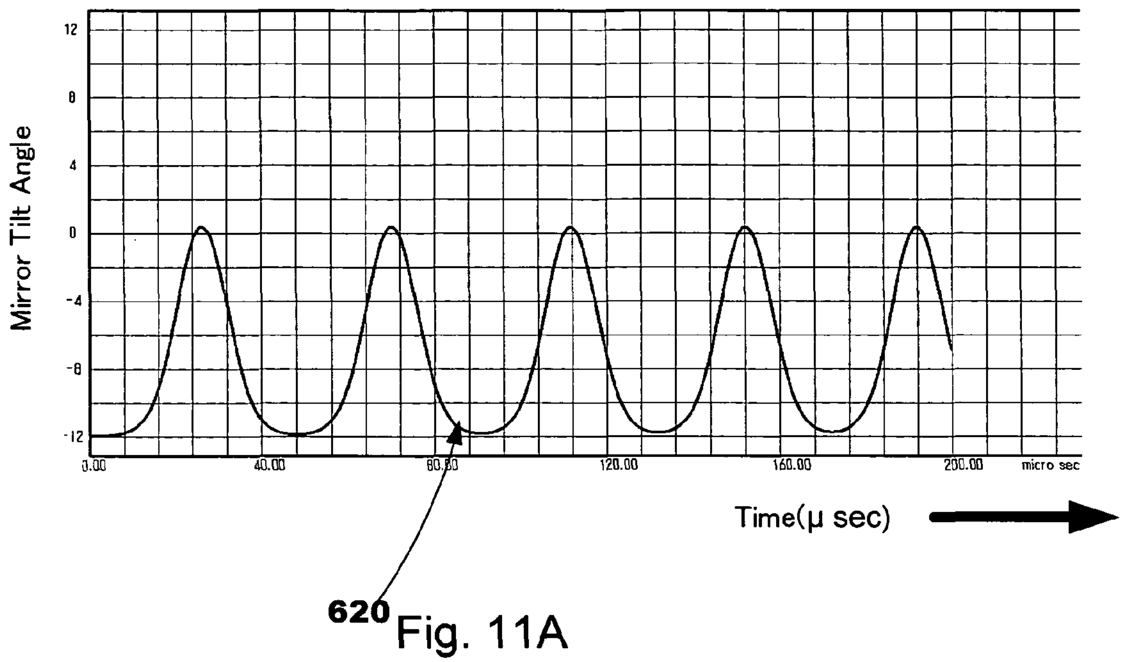
FIG. 11A illustrates the result of the simulation wherein the initial angle of the mirror is −12 deg. and near hold-voltage is applied to the left electrode and zero volts is applied to the right electrode.
Figure 11B:
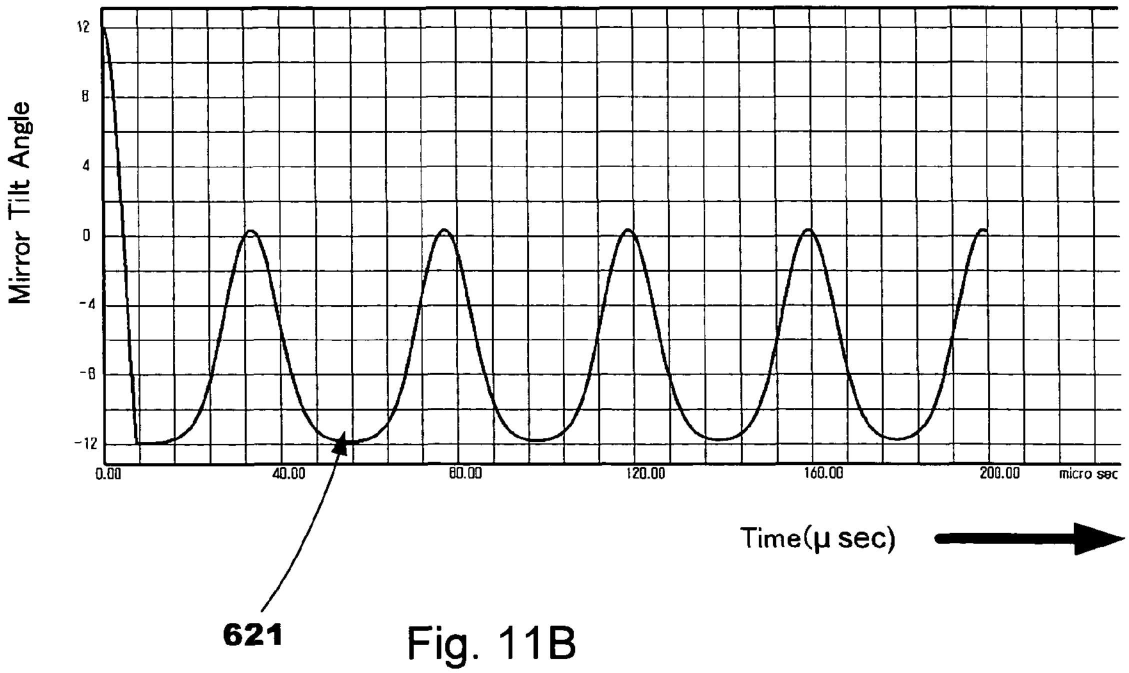
FIG. 11B illustrates the result of the simulation wherein the initial angle of the mirror is +12 deg. and near hold-voltage is applied to the left electrode and zero volts is applied to the right electrode.
Figure 12B:
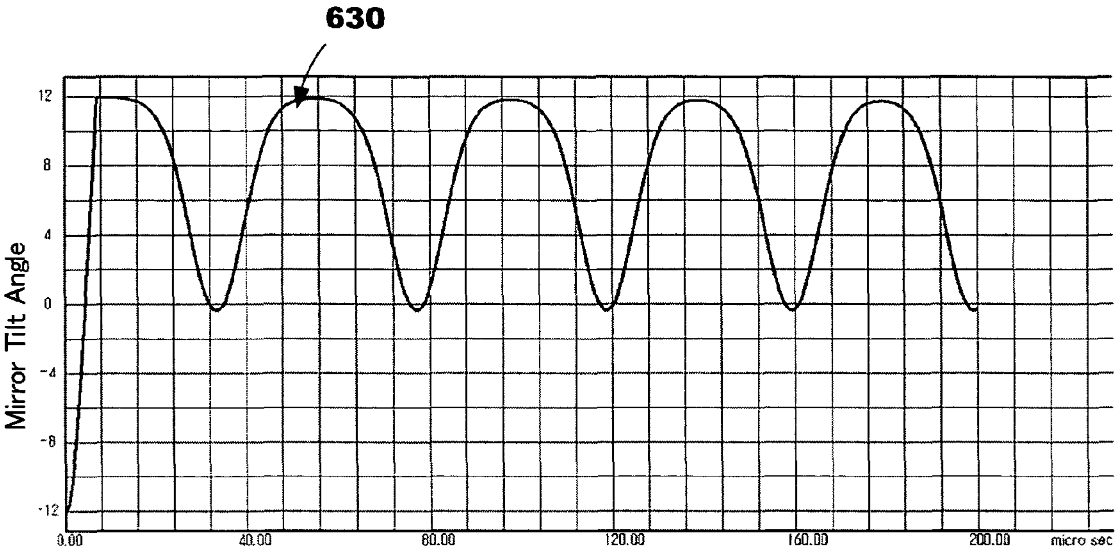
FIG. 12B illustrates the result of the simulation wherein the initial angle of the mirror is +12 deg. and near hold-voltage is applied to the right electrode and zero volts is applied to the left electrode.
Figure 12B:
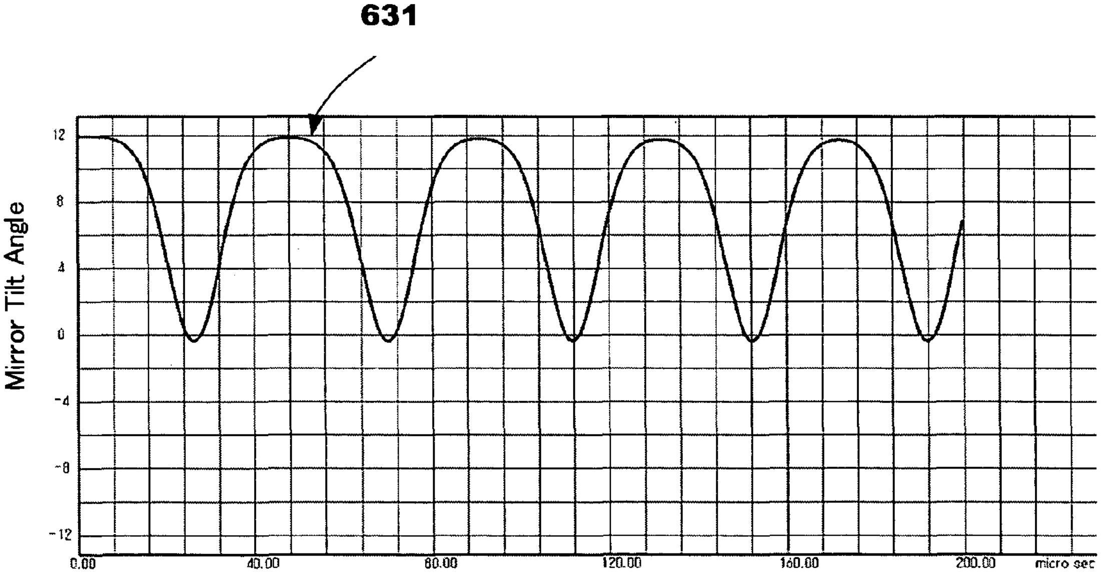

After the mirror stays at either ON or OFF position, when a voltage between zero and the hold-voltage, i.e., a voltage that is smaller than the pull-in voltage, is applied to the two electrodes cause the micromirror to oscillate as shown in FIG. 10. When zero volt is applied to both electrodes the micromirror oscillates between near ON (610) and near OFF (611) position. The cumulative reflectance in 200 microseconds is about 29% with a F2.8 lens system according to the simulation. The cumulative reflectance varies as the applied voltages to the electrodes change as the micromirror continuously oscillates along a central oscillation angle. FIGS. 11A and 11B show the simulation results when zero volts is applied to the left electrode and near hold-voltage is applied to the right electrode. The curve (620) in FIG. 11A represents the movement of the mirror when the mirror is released from the OFF position. The curve (621) in FIG. 11B represents the movement of the mirror when the mirror is released from the ON position. The mirror no longer moves between the ON and OFF positions, but between an intermediate position and the near OFF position. Not only biased angle but also the speed is slower at the near OFF position and faster at the intermediate position. The cumulative reflectance is about 0.2% that is well below 1/256. FIG. 12A (630) and 12B (631) show the reversed cases of FIG. 11 when the micromirror is controlled to oscillated with a central angle of oscillation near a FULL-ON angular position. The voltage near the hold-voltage is applied to the right electrode and a zero volt is applied to the left electrode. The cumulative reflectance in 200 microseconds is about 60%. Thus by changing the driving voltage under the "hold-voltage", the reflectance can be controlled continuously in analog way between 0.2% and 60% because of the variation of the central angle of oscillation in spite of conventional concept that the micromirror has "digital nature of mirror control" because the micromirror can only be controlled at a fixed angle when the micromirror is at either a near FULLY-ON and or a FULLY-OFF position.

According to FIGS. 11A to 12B, the controllable range of the brightness by controlling the central angle of micromirror oscillation is large enough to cover the desired brightness levels of 1/2, 1/4, 1/8, 1/16, 1/32, 1/64, 1/128 and 1/256. With this invention, since the central angle of oscillation can be controlled substantially according to an analog scale, a grayscales of 256 times higher levels or a grayscale with a 16-bit control can be easily achieved. The format of High Definition Optical Video Disc is standardized and it incorporates 16-bit grayscale for recording and processing. This invention will provide the solution for the requirement.

Figure 13:
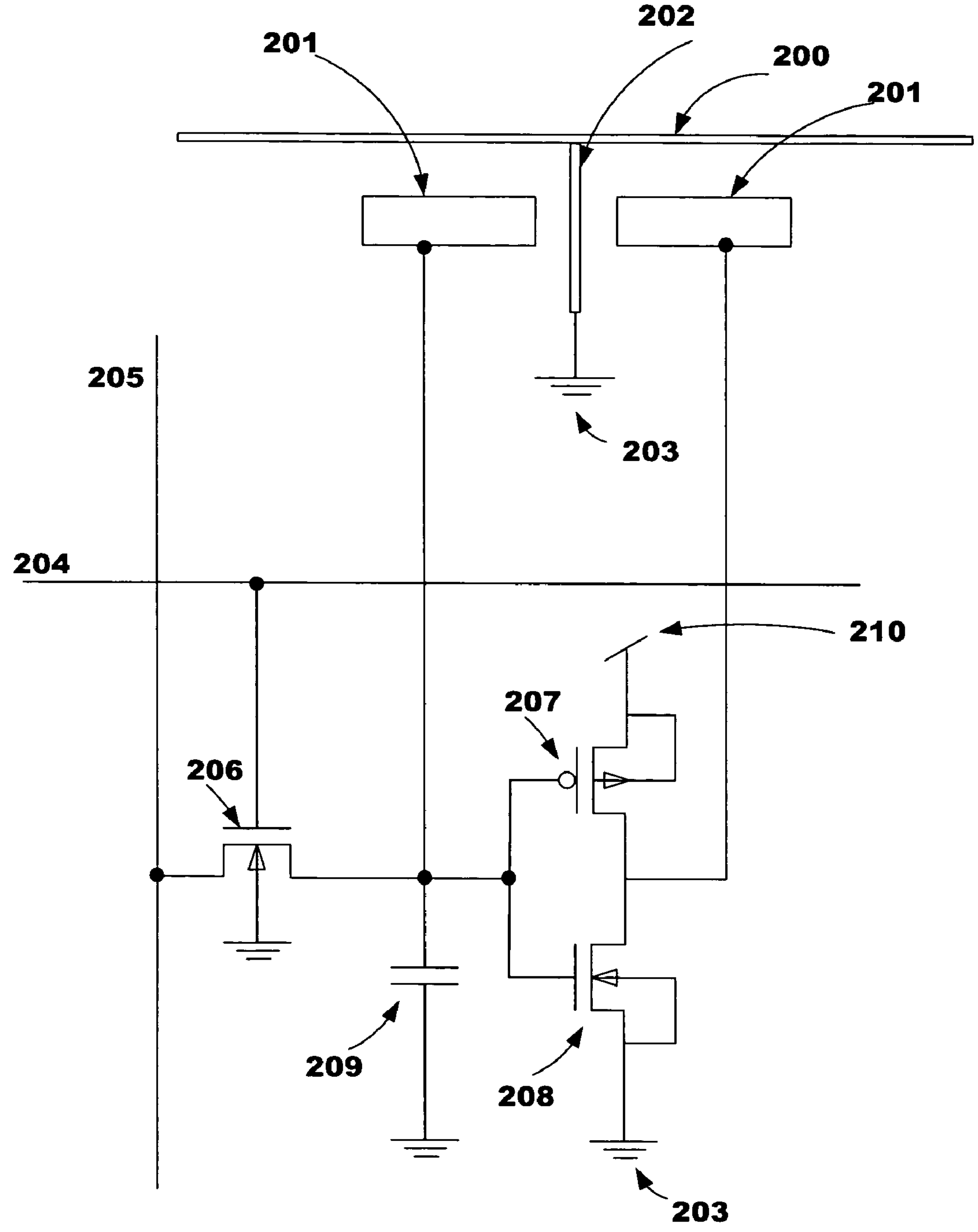
FIG. 13 illustrates an example of a circuit to implement a single bit-line system.
Figure 14A:
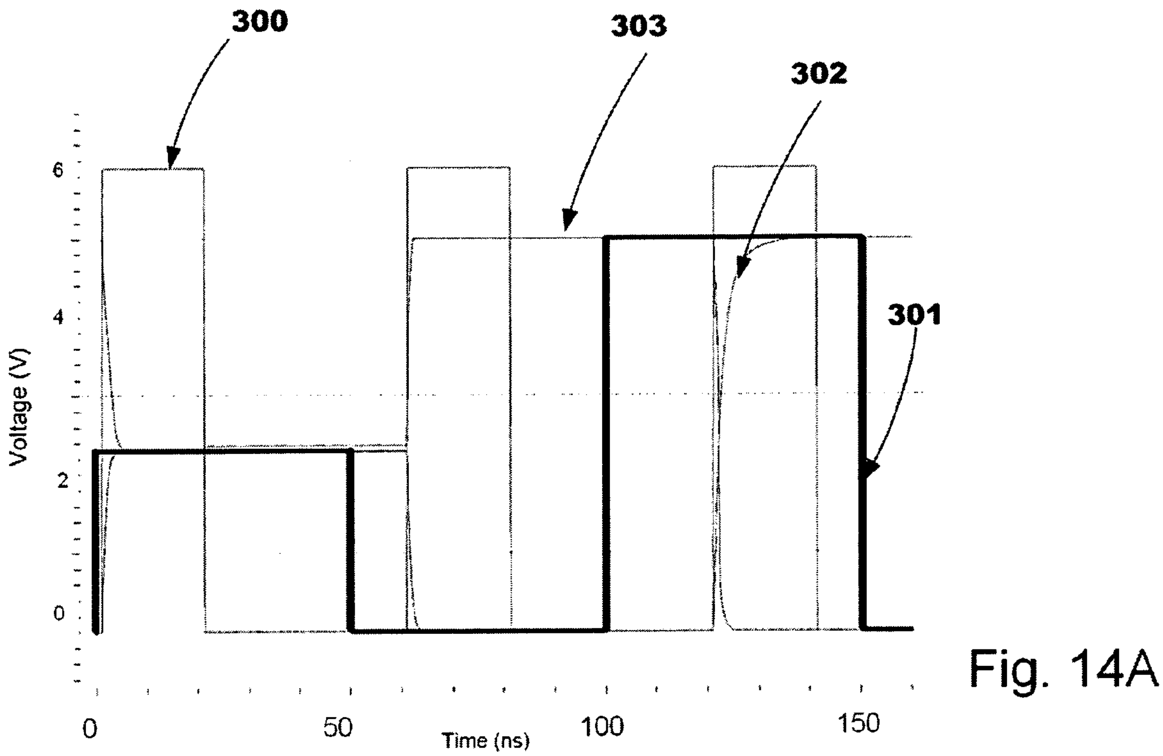
FIG. 14A illustrates an example of the voltage applied to the bit-line. The incoming video signal is provided to this bit-line based on the brightness level. The signal can contain the voltages corresponding to ON(=1), ½, ¼, ⅛, 1/16, 1/32, 1/64, 1/128, 1/256 and OFF(=0).
Figure 14B:
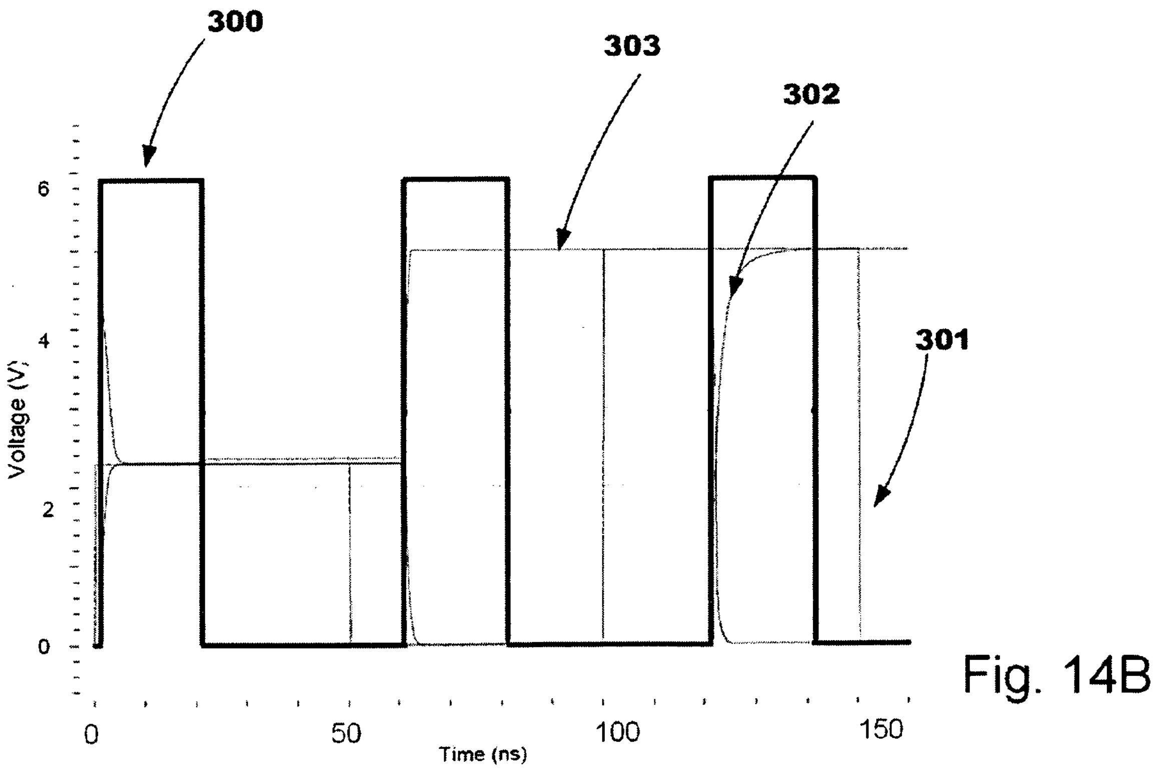
FIG. 14B illustrates the voltages applied to the word-line. The voltage can be slightly higher than the voltage of bit-line due to the junction loss of FET. The ON signal at the word-line opens the gate of the FET (206)
Figure 14C:
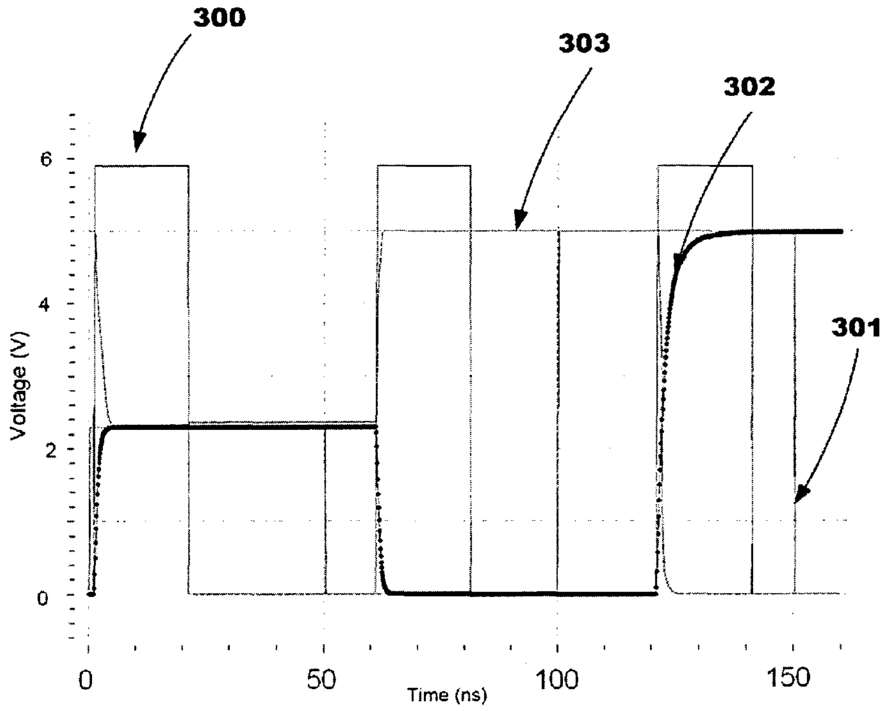
FIG. 14C illustrates the output voltage of the FET (206) and it is connected to the capacitor and the one of electrodes.
Figure 14D:
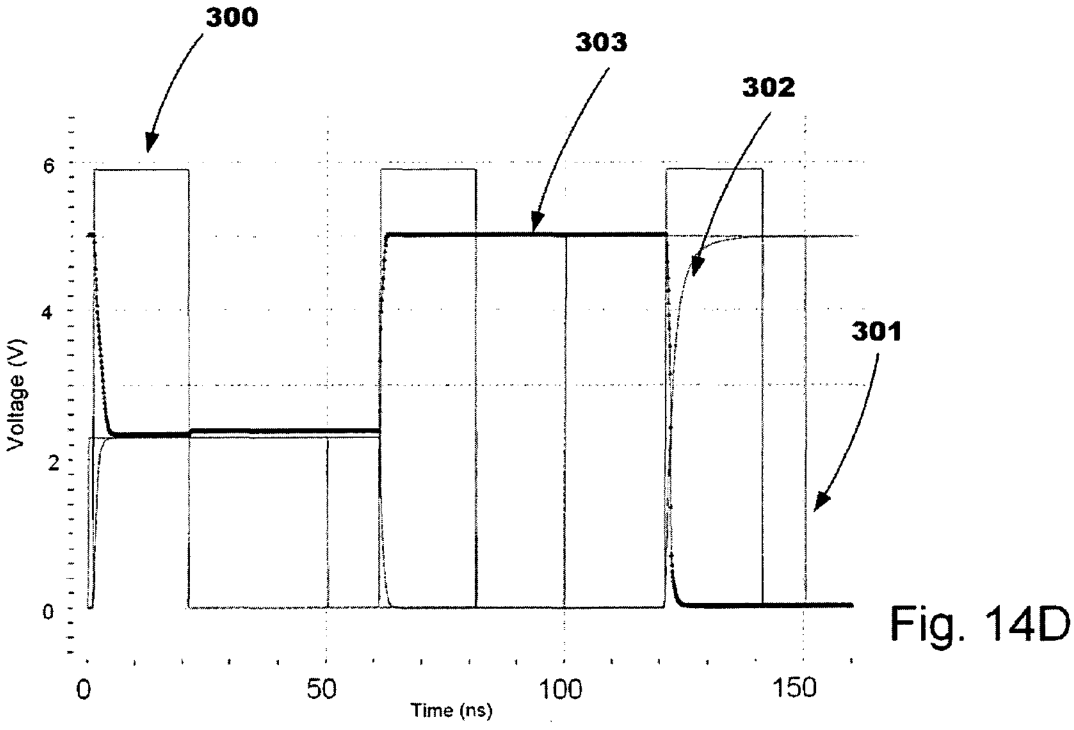
FIG. 14D illustrates the output of the inverter (207 and 208), which is complimentary to the output of 206 between the full ON and the full OFF voltages.

FIG. 13 shows another example of the embodiments of this invention. The previous example uses two bit-lines, but this driving circuit uses a single bit-line 204, which is very important for compact and small micromirrors. The incoming signal is provided through the bit-line 204 as an analog signal that may be at least more than two levels of voltages and theoretically infinite levels. The FET (206) transfers the incoming voltage to the capacitor (209) and the electrode (202). The two FETs (207, 208) invert the voltage (202) complementarily and provide the complimentary voltage to the electrode (201) wherein the summation of the voltages of the electrode-1 and the electrode-2 is nearly constant. With variation of voltage applied to the electrodes 201 and 202, this invention achieves almost analog levels of grayscale.

FIG. 14 shows the results of the simulation analyses of the circuit described in FIG. 13. The voltage at the bit-line is shown as the line (300). The voltage is varied at three different levels, 0 v (301B), 2.3 v (301A) and 5 v (301C) as an example. The voltages at the electrodes are shown in FIGS. 14C and 14D respectively on either of the electrodes. The voltages at the two electrodes are complimentary. This circuit can provide two electrodes with any level of complimentary voltages between OFF and ON voltages with a single bit-line, which is very beneficial for small and compact micromirrors.

FIG. 15 illustrates an example of the complimentary voltages supplied by the circuit shown in FIG. 13. The two voltages of applied to the two electrodes have a contact total sum of five volts while controlling the micromirror to oscillate along various central angles of oscillation thus generate various levels of reflection light corresponding to the angular position of the central angle of micromirror oscillation. Analog control of grayscales in an image display system is therefore achieved according to the disclosures as made in this invention.

According to above descriptions, this invention discloses a method for controlling a micromirror in an image display system. The method includes a step of applying a first voltage and a second voltage respectively on a first and second electrodes near the micromirror to control a central angle of oscillation with the micromirror oscillating around the central angle of oscillation. The method further includes another step of controlling the first and second voltages with an analog variation for controlling the central angle of oscillation to generate a correspondent analog angular variation thus controlling a brightness generated from a micromirror reflection to have an analog brightness variation corresponding to the analog angular variation of the central angle of oscillation. In an exemplary embodiment, the step of applying the first and second voltages respectively to the first and second electrodes further comprising a step of applying the second voltage to the second electrode as a function of the first voltage applied to the first electrode. In another exemplary embodiment, the step of applying the first and second voltages respectively to the first and second electrodes further comprising a step of applying the second voltage to the second electrode complimentary to the first voltage applied to the first electrode. In another exemplary embodiment, the step of applying the first and second voltages respectively to the first and second electrodes further comprising a step of first applying a pull-in voltage (V-pull-in) to pull the micromirror to a maximum angular position (θmax) followed by applying voltages less than a hold-voltages (Vh) to the first and second electrodes wherein the maximum angular position (θmax) is either a fully ON or fully Off angular position. In another exemplary embodiment, the method further includes a step of implementing a voltage control system for applying the hold-voltage (Vhold) higher than 60% of the pull-in-voltage (Vpull-in). In another exemplary embodiment, the method further includes a step of adjusting a gap between the mirror at the pull-in position and a surface of the electrode whereby the hold-voltage (Vhold) applied to the electrode is higher than 60% of the pull-in-voltage (Vpull-in). In another exemplary embodiment, the step of controlling the micromirror is a step of controlling the micromirror at a maximum angle and the central angle of oscillation of the micromirror is near a fully ON angular position for projecting a reflection light more than ⅓ of a full light intensity. In another exemplary embodiment, the method further includes a step of step of controlling the micromirror is a step of controlling the micromirror at a maximum angle about negative twelve degrees and the central angle of oscillation of the micromirror is near a fully OFF angular position for projecting a reflection light less than ¼ of a full light intensity. In another exemplary embodiment, the method further includes a step of step of applying the first and second voltages respectively to the first and second electrodes further comprising a step of applying voltages V1, V2 between zero volt and a hold-voltage (Vh) represented by $0<V1, V2<Vh$ to the first and second electrodes respectively to maintain a central micromirror oscillation angle at an intermediate angular position for controlling a reflection from the micromirror according to an analog scale. In another exemplary embodiment, the method further includes a step of adjusting an aperture of a projection of the image display system for adjusting an F-Value for achieving a designated value of the reflectance of the reflection light.

In another embodiment, this invention further discloses a method for controlling a micromirror in an image display system that includes a step of applying a voltage on an electrode near said micromirror to control a central angle of oscillation with said micromirror oscillating around said central angle of oscillation. The method further includes a step of controlling said voltage with an analog variation for controlling said central angle of oscillation to generate a correspondent analog angular variation thus controlling a brightness generated from a micromirror reflection to have an analog brightness variation corresponding to said analog angular variation of said central angle of oscillation.

This invention further discloses an image display system that includes an array of movable micromirrors each controlled by a mirror control system to oscillated between a fully-ON and fully-Off angular positions. The mirror control system further includes at least two electrodes for applying a first and a second voltages respectively thereon according to an analog scale for controlling each of the micromirrors to oscillate around a central angle of oscillation varying between the fully-On and fully-OFF angular positions according to an analog angular scale corresponding to the analog scale of the first and second voltages applied to the electrodes. In an exemplary embodiment, the image display system further includes a voltage controller for controlling the second voltage applied to the second electrode as a function of the first voltage applied to the first electrode. In another exemplary embodiment, the image display system further includes a voltage controller for controlling the second voltage applied to the second electrode complimentary to the first voltage applied to the first electrode. In another exemplary embodiment, the image display system further includes a projection lens for receiving a reflection light from each of the micromirrors controlled to oscillate around the central oscillation angle for projecting the reflecting light according to an analog grayscale corresponding to the analog angular scale of the central angle of oscillation in response to the voltages applied to the electrodes. In another exemplary embodiment, the image display system further includes a plurality of word-lines and bit-lines for controlling each of the electrodes near each of the micromirrors. In another exemplary embodiment, the two electrodes disposed near each of the micromirrors is controlled by one word-line and a pair of bit-lines. In another exemplary embodiment, the two electrodes disposed near each of the micromirrors is controlled by one word-line and one of bit-line with complimentary or reverse correlated voltages. In another exemplary embodiment, the image display system further includes a voltage controller for first applying a pull-in voltage (V-pull-in) to pull the micromirror to a maximum angular position (θmax) then applying voltages less than hold-voltages (Vh) to the first and second electrodes wherein the maximum angular position (θmax) is either a fully ON or fully Off angular position. In another exemplary embodiment, the voltage controller applies the hold-voltage (Vhold) higher than 60% of the pull-in-voltage (Vpull-in). In another exemplary embodiment, the voltage controller controlling the micromirror at a maximum angle about positive twelve degrees with the central angle of oscillation of the micromirror near a fully ON angular position for projecting a reflection light more than ⅓ of a full light intensity. In another exemplary embodiment, the voltage controller controlling the micromirror at a maximum angle about negative twelve degrees with the central angle of oscillation of the micromirror near a fully OFF angular position for projecting a reflection light less than ¼ of a full light intensity. In another exemplary embodiment, the voltage controller applying voltages V1, V2 between zero volt and a hold-voltage (Vh) represented by 0<V1, V2<Vh to the first and second electrodes respectively. to maintain a central micromirror oscillation angle at an intermediate angular position for controlling a reflection from the micromirror according to an analog scale. In another exemplary embodiment, the projection lens having an aperture for generating an F-Value corresponding to a designated value of the reflectance of the reflection light. In another exemplary embodiment, the micromirror and the first and the second electrodes having a mirror-electrode gap for generating a hold voltage Vhold with Vhold higher than or equal to 60% of the pull-in voltage Vpull-in.

This invention further discloses an image display system that includes an array of movable micromirrors each controlled by a mirror control system to oscillate between a fully-ON and fully-Off angular positions. The mirror control system further includes an electrode for applying a first and a second voltages thereon according to an analog scale for controlling each of the micromirrors to oscillate around a central angle of oscillation varying between the fully-On and fully-OFF angular positions according to an analog angular scale corresponding to the analog scale of the first and second voltages applied to the electrode.

As shown before, by varying the driving voltages, the reflectance can be changed continuously in a certain range, which is important to control grayscale, because it provides flexibility of the system design.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A method for controlling a micromirror in an image display system comprising:

applying a first voltage and a second voltage respectively on two electrodes near said micromirror to control an adjustable angle of a central axis of oscillation between a fully-ON angle and a fully-OFF angle by controlling said micromirror to continuously oscillate to two substantially constant angles symmetrically over two opposite directions relative to said central axis of oscillation for a controlled time period to adjust and control an image display brightness reflecting from a micromirror during the controlled time period corresponding to said adjustable angle of said central axis of oscillation.

2. The method of claim 1 wherein:

said step of applying said first and second voltages respectively to said first and second electrodes further comprising a step of applying said second voltage to said second electrode as a function of said first voltage applied to said first electrode to control said central axis of oscillation to direct to a predefined angle during the controlled time period as function of said first and second voltages.

3. The method of claim 1 wherein:

said step of applying said first and second voltages respectively to said first and second electrodes further comprising a step of applying said second voltage to said second electrode complimentary to said first voltage applied to said first electrode to adjust said central oscillation axis during the controlled time period near either said first electrode or said second electrode.

4. The method of claim 1 wherein:

said step of applying said first and second voltages respectively to said first and second electrodes further comprising a step of first applying a pull-in voltage (V-pull-in) to one of said first and second electrodes as a pull-in electrode to pull said micromirror to a maximum angular position (θmax) followed by applying a brightness adjustable voltage less than a hold-voltages (Vh) to said pull-in electrode to release said micromirror from holding to said pull-in electrode and start to continuously oscillate symmetrically to the two substantially constant angles on two opposite directions relative to said central axis of oscillation during the controlled time period depending on said brightness adjustable voltage applied to the pull-in electrode.

5. The method of claim 4 further comprising:

implementing a voltage control system for continuously applying said hold-voltage (Vhold) during a controlled holding time period to said pull-in electrode substantially equal to or higher than 60% of said pull-in-voltage (Vpull-in).

6. The method of claim 5 further comprising:

adjusting a gap between said mirror at said pull-in position and a surface of said electrode whereby said hold-voltage (Vhold) is continuously applied to said pull-in electrode during the controlled holding time period substantially equal to or higher than 60% of said pull-in-voltage (Vpull-in).

7. The method of claim 2 wherein:

said step of controlling said micromirror comprises a step of controlling said adjustable angle of said central axis of oscillation to continuously oscillate said micromirror to the two substantially constant angles symmetrically over two opposite directions relative to said central axis of oscillation near a fully ON angular position during the controlled time period for projecting a reflection light substantially equal to or more than ⅓ of a full light intensity.

8. The method of claim 2 wherein:

said step of controlling said micromirror comprises a step of controlling said adjustable angle of said central axis of oscillation to continuously oscillate said micromirror to the two substantially constant angles symmetrically over two opposite directions relative to said central axis of oscillation near a fully OFF angular position during the controlled time period for projecting a reflection light substantially equal to or less than ¼ of a full light intensity.

9. The method of claim 4 wherein:

said step of applying said first and second voltages respectively to said first and second electrodes further comprising a step of applying voltages V1, V2 between zero volt and a hold-voltage (Vh) represented by 0<V1, V2<Vh to said first and second electrodes respectively to continuously oscillate said micromirror to the two substantially constant angles symmetrically over two opposite directions relative to said central axis of oscillation during the controlled time period for controlling said central axis of oscillation substantially at an intermediate angular position.

10. The method of claim 1 further comprising:

adjusting projection aperture of said image display system for adjusting an F-Value to project an image for adjusting a reflectance of said reflection light from said micromirror, during the controlled time period depending on said adjustable angle of said central axis of oscillation.

11. A method for controlling a micromirror in an image display system comprising:

applying a voltage on a single electrode near said micromirror to control an adjustable angle of a central axis of oscillation to control said micromirror to continuously oscillate to two substantially constant angles symmetrically over two opposite directions relative to said central axis of oscillation in a controlled time period; and adjusting said voltage to generate a correspondent brightness reflecting from a micromirror during the controlled time period corresponding to said adjustable angle of said central axis of oscillation.

12. An image display system comprising an array of movable micromirrors each controlled by a mirror control system to oscillated between a fully-ON and fully-Off angular positions wherein:

said mirror control system further includes two electrodes for applying a first and a second voltages respectively thereon for controlling each of said micromirrors to continuously oscillate to two substantially constant angles symmetrically over two opposite directions relative to an adjustable angle of a central axis of oscillation between said fully-On and fully-OFF angular positions in a control time period to generate a corresponding image display brightness reflecting from said micromirrors corresponding to said first and second voltages applied to said electrodes.

13. The image display system of claim 12 further comprising:

a voltage controller for controlling said second voltage applied to said second electrode as a function of said first voltage applied to said first electrode to control said micromirror to continuously oscillate to the two substantially constant angles symmetrically over two opposite directions relative to said central axis of oscillation during the controlled time period as function of said first and second voltages.

14. The image display system of claim 12 further comprising:

a voltage controller for controlling said second voltage applied to said second electrode complimentary to said first voltage applied to said first electrode to control said micromirror to continuously oscillate to the two substantially constant angles symmetrically over two opposite directions relative to central axis of oscillation during the controlled time period as function of said first and second voltages.

15. The image display system of claim 12 further comprising:

a projection lens for receiving a reflection light from each of said micromirrors controllable to continuously oscillate to the two substantially constant angles symmetrically over two opposite directions relative to said central axis of oscillation during the controlled time period for projecting said reflecting light with a brightness-corresponding to said adjustable angle of said central axis of oscillation in response to said voltages applied to said electrodes.

16. The image display system of claim 8 further comprising:

a plurality of word-lines and bit-lines for controlling a signal for applying said voltages during the controlled time period to each of said electrodes near each of said micromirrors.

17. The image display system of claim 12 further comprising:

wordlines and bitlines for transmitting control signals for selectively applying voltages during the controlled time period to said two electrodes disposed near each of said micromirrors.

18. The image display system of claim 12 further comprising:

wordlines and bitlines for transmitting control signals for selectively applying complimentary or reverse correlated voltages during the controlled time period to said two electrodes disposed near each of said micromirrors.

19. The image display system of claim 12 further comprising:

a voltage controller for first applying a pull-in voltage (V-pull-in) to one of said first and second electrodes as a pull-in electrode to pull said micromirror to a maximum angular position (θmax) then applying a brightness adjustable voltage less than a hold-voltage (Vh) to said pull-in electrode during the controlled time period to release said micromirror from holding to said pull-in electrode and start to continuously oscillate to the two substantially constant angles symmetrically on two opposite directions relative to said central axis of oscillation during the controlled time period depending on said brightness adjustable voltage applied to the pull-in electrode.

20. The image display system of claim 19 wherein:

said voltage controller applying the brightness adjustable voltage less than said hold-voltage (Vhold) to said pull-in electrode substantially equal to or higher than 60% of said pull-in-voltage (Vpull-in).

21. The image display system of claim 19 wherein:

said voltage controller controlling said adjustable angle of said central axis of oscillation to continuously oscillate said micromirror during the controlled time period to the two substantially constant angles symmetrically over two opposite directions relative to said central axis of oscillation near a fully ON angular position for projecting a reflection light substantially equal to or more than ⅓ of a full light intensity.

22. The image display system of claim 19 wherein:

said voltage controller controlling said adjustable angle of said central axis of oscillation to continuously oscillate said micromirror to the two substantially constant angles during the controlled time period symmetrically over two opposite directions relative to said central axis of oscillation near a fully OFF angular position for projecting a reflection light substantially equal to or less than ¼ of a full light intensity.

23. The image display system of claim 19 wherein:

said voltage controller applying voltages V1, V2 between zero volt and the hold-voltage (Vh) represented by $0<V1, V2<Vh$ to said first and second electrodes respectively to continuously oscillate said micromirror to the two substantially constant angles symmetrically over two opposite directions relative to said central axis of oscillation during the controlled time period for controlling said central axis of oscillation substantially at an intermediate angular position.

24. The image display system of 15 wherein:

said projection lens having an aperture with an F-Value to project an image for adjusting a reflectance of said reflection light from said micromirror during the controlled time period depending on said adjustable angle of said central axis of oscillation.

25. The image display system of 19 wherein:

said micromirror is controlled to contact an insulation layer covering said first and said second electrodes having a mirror-electrode gap for generating a hold voltage Vhold with said Vhold voltage substantially equal to or higher than or equal to 60% of said pull-in voltage Vpull-in.

26. An image display system comprising an array of movable micromirrors each controlled by a mirror control system to oscillated between a fully-ON and fully-Off angular positions wherein:

said mirror control system further includes a single electrode for applying an adjustable voltage thereon for controlling an adjustable angle of a central axis of oscillation for each of said micromirrors to continuously oscillate to two substantially constant angles symmetrically over two opposite directions relative to said central axis of oscillation in a controlled time period between said fully-On and fully-OFF angular positions corresponding to said adjustable voltage applied to said single electrode whereby a correspondent adjustable brightness is reflected during the controlled time period from each of said movable micromirrors corresponding to said adjustable angle of said central axis of oscillation.

* * * * *